US010614485B1

(12) United States Patent
Ford et al.

(10) Patent No.: US 10,614,485 B1
(45) Date of Patent: Apr. 7, 2020

(54) DETERMINATION OF FINANCIAL IMPACT OF PROMOTIONAL ACTIVITIES

(71) Applicant: Amazon Technologies, Inc., Seattle, WA (US)

(72) Inventors: Daniel Morgan Ford, Seattle, WA (US); Hendrik Jacobus de Kock, Seattle, WA (US); Austin Fox, Seattle, WA (US); Dina Hilal, Kirkland, WA (US); Mohanish Hemant Kulkarni, Seattle, WA (US); Gerard P. Learmonth, Jr., Seattle, WA (US); Chuen Leong Liang, Seattle, WA (US); Yaodong Liu, Bellevue, WA (US); Graham Thomas Ludwinski, Seattle, WA (US); Yusuf Roso, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 748 days.

(21) Appl. No.: 15/239,511

(22) Filed: Aug. 17, 2016

(51) Int. Cl.
*G06Q 30/00* (2012.01)
*G06Q 30/02* (2012.01)
*G06N 20/00* (2019.01)

(52) U.S. Cl.
CPC ......... *G06Q 30/0246* (2013.01); *G06N 20/00* (2019.01); *G06Q 30/0247* (2013.01)

(58) Field of Classification Search
None
See application file for complete search history.

(56) References Cited

U.S. PATENT DOCUMENTS

| 9,886,172 | B1* | 2/2018 | Cronin | G06F 3/013 |
|---|---|---|---|---|
| 2001/0029615 | A1* | 10/2001 | Shirakawa | H04H 20/06 |
| | | | | 725/119 |
| 2007/0011050 | A1* | 1/2007 | Klopf | G06Q 30/02 |
| | | | | 705/14.13 |
| 2007/0143186 | A1* | 6/2007 | Apple | G06Q 30/02 |
| | | | | 705/14.48 |
| 2008/0306804 | A1* | 12/2008 | Opdycke | G06Q 10/0631 |
| | | | | 705/14.43 |
| 2010/0200657 | A1* | 8/2010 | Morgan | G06Q 30/02 |
| | | | | 235/383 |
| 2011/0288907 | A1* | 11/2011 | Harvey | G06Q 10/0639 |
| | | | | 705/7.29 |
| 2011/0313805 | A1* | 12/2011 | Heydemann | G06Q 10/06 |
| | | | | 705/7.14 |

(Continued)

*Primary Examiner* — Matthew T Sittner
(74) *Attorney, Agent, or Firm* — Lee & Hayes, P.C.

(57) ABSTRACT

A content item may be received from an author and offered to customers on behalf of the author. A promotional activity associated with the content item may be conducted or performed. A baseline amount of sales expected for the content item during a time period associated with the promotional activity may be determined. The actual amount of sales of the content item during the time period may also be determined. Based on the baseline amount of sales and the actual amount of sales, the financial impact of the promotional activity may be determined. The expected financial impact of a future promotional activity for the content item that has yet to occur may be predicted. Some or all of the data may be visually presented to the author via a self-service interface.

20 Claims, 5 Drawing Sheets

(56) References Cited

U.S. PATENT DOCUMENTS

| | | | | |
|---|---|---|---|---|
| 2012/0209963 A1* | 8/2012 | Patel | G06F 16/958 | 709/219 |
| 2013/0166351 A1* | 6/2013 | Arunachalam | G06Q 10/06375 | 705/7.31 |
| 2014/0025478 A1* | 1/2014 | Mischuk | G06Q 30/0242 | 705/14.41 |
| 2014/0067535 A1* | 3/2014 | Rezaei | G06Q 30/0256 | 705/14.54 |
| 2014/0114788 A1* | 4/2014 | Baskin | G06Q 30/08 | 705/26.3 |
| 2014/0207583 A1* | 7/2014 | Fujiwara | G06Q 30/0251 | 705/14.69 |
| 2014/0244368 A1* | 8/2014 | Singhania | G06Q 30/0211 | 705/14.13 |
| 2014/0330637 A1* | 11/2014 | Moran | G06Q 30/0244 | 705/14.43 |
| 2014/0358773 A1* | 12/2014 | Lerner | G06Q 40/00 | 705/39 |
| 2015/0032541 A1* | 1/2015 | Haddad | G06Q 30/0259 | 705/14.57 |
| 2015/0088966 A1* | 3/2015 | Gayles | H04L 67/22 | 709/203 |
| 2015/0161659 A1* | 6/2015 | Cooley | G06Q 30/0246 | 705/14.45 |
| 2015/0355606 A1* | 12/2015 | Chillar | G05B 13/021 | 700/286 |
| 2016/0044374 A1* | 2/2016 | Ren | H04N 21/44016 | 725/34 |
| 2016/0078494 A1* | 3/2016 | Hendricks | G06Q 30/0269 | 705/14.66 |
| 2016/0080485 A1* | 3/2016 | Hamedi | G06F 16/24578 | 709/204 |
| 2016/0132940 A1* | 5/2016 | Frommann | G06Q 30/0249 | 705/14.48 |
| 2016/0253693 A1* | 9/2016 | Minashima | G06Q 30/0214 | 705/14.16 |
| 2017/0372356 A1* | 12/2017 | Frommann | G06Q 30/0246 | |
| 2019/0147500 A1* | 5/2019 | Frommann | G06Q 30/0276 | |

* cited by examiner

DETERMINATION OF FINANCIAL IMPACT OF PROMOTIONAL ACTIVITIES

BACKGROUND

In an advertising campaign, an advertiser may promote items of an entity, such as an individual, a publisher, a merchant, and so on. Typically, the advertiser may provide, to the entity, various information relating to the advertising campaign. Such information may include an amount spent by the entity, a number of advertisements provided to customers, and/or a number of impressions of the advertisement. However, existing advertisement systems are unable to determine the amount of additional sales, revenue, and/or profit resulting from the advertising campaign. The entity, as a result, is unable to determine whether he/she actually benefits from the advertising campaign, or whether the costs associated with the advertising campaign are worth the benefits, if any.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
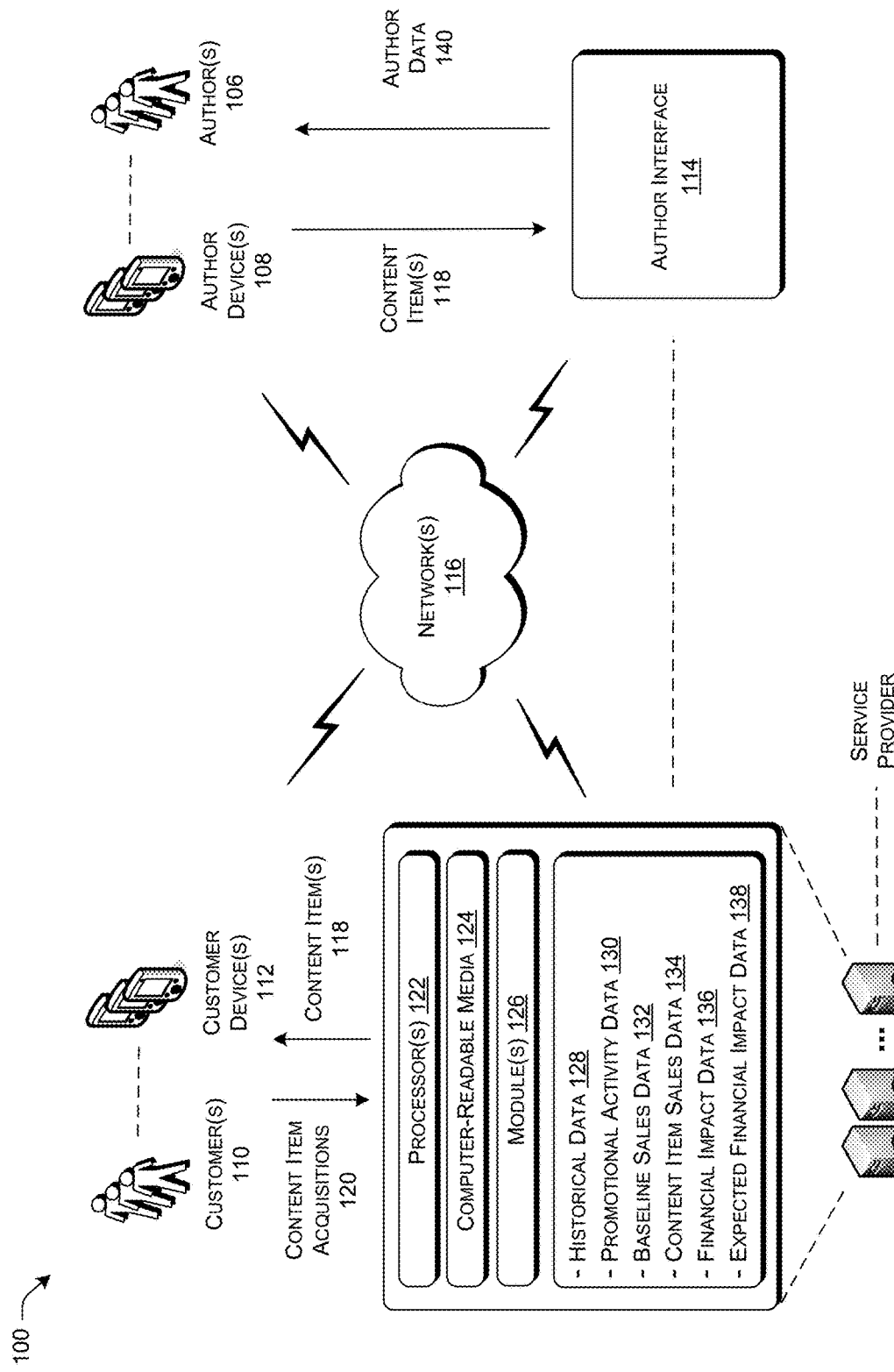
FIG. 1 illustrates an example system for determining a financial impact of a promotional activity associated with a content item.

The systems and processes described herein relate to determining a financial impact of a promotional activity associated with a content item that is offered for acquisition to customers. In various embodiments, a service provider may publish or release a content item (e.g., an electronic book (eBook), a physical book, etc.) on behalf of an author (or an agent of the author, a translator, an illustrator, etc.) to customers. In addition to merely offering the content item for acquisition by customers, such as via a website, an electronic marketplace, and/or a mobile application, the service provider may conduct or perform one or more promotional activities with respect to the content item. Examples of such promotional activities may include any communications that promote or advertise the content item, including e-mail messages, electronic advertisements via a website/mobile application, book signings attended by the author, and so on.

In various embodiments, the service provider may determine a time period associated with the promotional activity (e.g., a period of time in which an electronic advertisement is provided to customers). Moreover, based on historical data relating to the content item and/or different content items (e.g., content items by the same author, content items in the same genre, etc.), the service provider may determine or estimate a baseline amount of sales (e.g., number of units sold, revenue for the content item, etc.) that would be expected for the content item during that time period. Upon initiating the promotional activity, the service provider may determine an actual amount of sales of the content item during the time period. The service provider may determine a financial impact of the promotional activity with respect to the content item based on the determined baseline amount of sales and the actual amount of sales for the content item. For instance, the financial impact of the promotional activity may be determined by subtracting the baseline amount of sales of the content item from the actual amount of sales of the content item. As a result, the service provider and the author may determine additional sales of the content item that are attributable to the promotional activity. Some or all of this information may be audibly or visually presented to the author, such as via an author interface that is maintained by the service provider and that is accessible by the author via a corresponding author device.

In other embodiments, with respect to a content item associated with an author, the service provider may predict/determine an expected financial impact of a future promotional activity for the content item that has yet to occur. To determine the expected financial impact of the future promotional activity, the service provider may leverage historical data relating to similar/related content items, such as content items by the same author, content items in the same genre as the content item, content items in the same series of content items, and so on. More particularly, the historical data may include prior promotional activities for the related content items and the prior financial impact of those prior promotional activities. Based on a similarity between the content item and the related content items, a similarity of the promotional activity and the prior promotional activities, and/or the prior financial impact, the service provider may predict an expected financial impact of the promotional activity (e.g., sales that are attributable to the promotional activity).

For the purposes of this discussion, a content item may be manifested in many different ways including, for example, as text-based items, audio items, video items, multimedia items, graphical items, and so forth. In some embodiments, the architecture and techniques are described in the context of eBook reader devices and electronic books. The terms "electronic book" and/or "eBook," as used herein, include electronic or digital representations of printed works (or portions of printed works), as well as digital content that may include text, multimedia, hypertext and/or hypermedia. Examples of printed and/or digital works include, but are not limited to, books, manuscripts, magazines, newspapers, periodicals, journals, reference materials, telephone books, textbooks, anthologies, instruction manuals, proceedings of meetings, forms, directories, maps, web pages, etc. However, certain concepts described herein are also applicable to other types of content items, such as music, audio books, video, and other content items that people watch, listens to, consume, or otherwise experience.

Further, eBooks are just one form of a common work. The common work may represent the text of the book regardless of the format. For example, an eBook may also be released in other forms, such as paperback, hardcover, and audio. Although a rights holder such as a publisher, author, agent, distributor, etc. may have rights such as a copyright in the common work, multiple copies of that work may be owned by various end users. If the work is manifested in digital form (e.g., eBook), digital rights management (DRM) or other technological features may prevent lending or may limit a number of times that the digital copy of the common work may be lent. Thus, unlike paperback or hardback versions of a book, the ability to lend an eBook (or other digital item) may be a limited resource that has a high value because of the scarceness of "lends" associated with the eBook.

FIG. 1 illustrates an example system 100 for determining the financial impact of a promotional activity associated with a content item, and visually presenting various data to an author of the content item. As shown in FIG. 1, the system 100 may include a service provider 102, one or more content servers 104 associated with the service provider 102, one or more authors 106, one or more author devices 108 associated with the authors 106, one or more customers 110, one or more customer devices 112 associated with the customers 110, and an author interface 114. The service provider 102, the content server(s) 104, the author device(s) 108, and/or the customer device(s) 112 may communicate via one or more networks 116.

Existing systems may perform promotional activities for content items (e.g., electronic advertisements, e-mail marketing campaigns, book signings, etc.), but such systems are unable to determine whether the promotional activities resulted in additional sales that are attributable to the promotional activities. Existing systems are also unable to determine the extent to which promotional activities result in additional sales of the content item. Accordingly, since such data is unavailable, an author of a content item is unable to determine whether the financial impact of a promotional activity for the content item outweighs the cost, to the author, of the promotional activity. That is, since the author is unable to determine whether a promotional activity for a content item results in additional sales of the content item, the author is unable to determine whether submitting the content item to the service provider 102 for publication is worth the associated cost.

The systems and processes described herein solve these technological problems. Initially, the service provider 102 may receive content items 118 provided by authors 106, and then publish the content items 118 on behalf of the authors 106. That is, the authors 106 may write, create, generate, etc., the content items 118 and provide the content items 118 to the service provider 102, such as via the author interface 114. Upon receiving the content items 118, the content server(s) 104 may store the content items 118 and the service provider 102 may offer the content items 118 to customers 110 on behalf of the authors 106. As discussed below, the customers 110 may purchase, rent, borrow, etc., the content items 118 from the service provider 102 via a website, mobile application, etc., associated with the service provider 102. Upon customers 110 acquiring a particular content item 118, at least a portion of the consideration paid by the customers 110 may be provided to the author 106 of that content item 118. As will be discussed in additional detail below, the financial impact and/or the expected financial impact of a promotional activity and/or a future promotional activity, respectively, of the content item 118 may be determined and visually presented to the author 106 of the content item 118.

For the purposes of this discussion, the service provider 102 may receive the content items 118 from the authors 106 via the author interface 114, and may offer the content items 118 (e.g., books, eBooks, etc.), as well as other items (e.g., products, services, etc.), to the customers 110 via an electronic marketplace (e.g., a website, a mobile application, a graphical user interface, etc.) associated with the service provider 102. That is, the authors 106 may access the author interface 114 using corresponding author devices 108 (e.g., mobile telephone, laptop computer, desktop computer, tablet computer, eBook reader device, gaming console, etc.) for the purpose of providing content items 118 and/or viewing data relating to such content items 118. Moreover, the customers 110 may access the electronic marketplace via corresponding customer devices 112 for the purpose of searching for, viewing, selecting, acquiring (e.g., purchasing, leasing, renting, borrowing, lending, etc.), etc., the content items 118 (or other items). The content items 118 may be provided directly by the service provider 102, or may be provided by the service provider 102 on behalf of the authors 106. That is, via a website, an electronic marketplace, and/or a mobile application associated with the service provider 102, the customers 110 may place orders for the content items 118. Content items 118 acquired by customers 110 may be physically delivered to the customers 110 (e.g., physical books). Other types of content items 118 (e.g., eBooks) may be downloaded to, or may be accessible by, the customer devices 112 of the customers 110. For instance, the content items 118 (e.g., eBooks) may be streamed from the content server(s) 104 to the customer devices 112 or the content items 118 may be otherwise accessible to the customer devices 112 via the network(s) 116. For the purpose of this discussion, content items 118 acquired by customers 110 may be referred to herein as content item acquisitions 120.

The content server(s) 104 of the service provider 102 may contain any number of servers that are possibly arranged as a server farm, although other server architectures may also be used to implement the content servers 104. Moreover, as shown, the content server(s) 104 may include one or more processors 122, computer-readable media 124, and one or modules 126. The processor(s) 122 may execute the one or more modules 126 and/or processes to cause the content server(s) 104 to perform a variety of functions, as set forth above and explained in further detail in the following disclosure. In some embodiments, the processor(s) 122 may include a central processing unit (CPU), a graphics processing unit (GPU), both CPU and GPU, or other processing units or components known in the art. Additionally, each of the processor(s) 122 may possess its own local memory, which also may store program modules, program data, and/or one or more operating systems.

The computer-readable media 124 may include volatile memory (such as RAM), non-volatile memory (such as ROM, flash memory, miniature hard drive, memory card, or the like), or some combination thereof. The computer-readable media 124 may be non-transitory computer-readable media 124. The computer-readable media 124 may include, or be associated with the one or more modules 126 that perform various operations associated with the content server(s) 104. In some embodiments, the one or more modules 126 may include or be associated with computer-executable instructions that are stored by the computer-readable media 124 and that are executable by the processor(s) 122 to perform such operations. In various embodiments, the computer-readable media 124 may store the content items 118 and various types of data, which may include historical data 128, promotional activity data 130, baseline sales data 132, content item sales data 134, financial impact data 136, and expected financial impact data 138. The content server(s) 104 may also include additional components/data not listed above that may perform any function associated with the content server(s) 104.

For the purposes of this discussion, the authors 106 may include any entity that is involved in the creation, editing, publishing, etc., of the content items 118. For instance, the author 106 may include the actual author 106 of the content item 118, which may correspond to the individual that wrote or created the content item 118 (e.g., wrote the text included in the content item 118). The author 106 may also correspond to an agent of the actual author 106 that is authorized by the actual author 106 to act on behalf of the actual author 106. The author 106 may also be an illustrator of pictures, images, diagrams, etc., included in the content item 118, a translator that converted the text/audio/video of the content item 118 from a first language to a second, different language, a distributor of the content item 118, an editor that was involved with revising or editing the content item 118, an individual/entity that is rights holder of the content item 118, and any other individual or entity that is otherwise associated with the content item 118. In various embodiments, the author 106 may be an individual, a group of individuals, or an entity (e.g., an organization, corporation, non-profit company, union, co-operative, etc.).

Moreover, the author 106 may provide a content item 118, or a manuscript or draft of the content item 118, to the service provider 102. For instance, the author 106 may provide the content item 118 to the service provider 102 via the author interface 114, which may be a self-service interface (e.g., website, portal, etc.) that is accessible by the authors 106 and that is associated with the service provider 102. In some instances, each author 106 may have a corresponding author interface 114, or each author 114 may provide a login and/or password (or other identifying information) that causes the author interface 114 to display information associated with the author 106 that provided the login/password. The author 106 may provide the content item(s) 118 to the service provider 102 for the purpose of having the service provider 102 publish the content item(s) 118, such as by offering the content item(s) 118 to customers 110 on behalf of the authors 106. As discussed above, the content items 118 may include any type of items that may be purchased, borrowed, consumed, etc., by the customers 110, such as books, eBooks, audio files (e.g., audio books), video files, and so on.

For the purpose of this discussion, the customers 110 may include any person or entity that interacts with the service provider 102 for the purpose of ordering, acquiring, purchasing, etc., the content items 118 (e.g., content item acquisitions 120). The customers 110 may interact with the service provider 102 via corresponding customer devices 112, which may include cellular telephones, tablet devices, laptop computers, desktop computers, gaming consoles, electronic book (eBook) reader devices, and so on. Moreover, the network(s) 116 may facilitate communications and/or interactions between the content server(s) 104 of the service provider 102, the author devices 108, the customer devices 112, and/or the author interface 114. The network(s) 116 may facilitate such communications/interactions via any type of network 116, such as a public wide-area-network 116 (WAN) (e.g., the Internet), which may utilize various different technologies including wired and wireless technologies.

In various embodiments, the service provider 102 may determine historical data 128, which may include content items 118 that were previously offered to, and acquired by, customers 110. For each of these content items 118, the historical data 128 may include an identity of the content items 118, the author(s) 106 and/or genre associated with the content items 118, prior promotional activities associated with the content items 118, sales data associated with the content items 118, and/or the financial impact of the prior promotional activities.

The promotional activity data 130 may correspond to one or more promotional activities associated with a particular content item 118. A promotional activity for the content item 118 may include any activity, promotion, advertisement, event, etc., associated with the content item 118 that is displayed or otherwise presented to the customers 110. For instance, a promotional activity may include an electronic advertisement for the content item 118, which may include an e-mail advertisement, an electronic advertisement presented via a website or mobile application, an electronic advertisement presented via a mobile device (e.g., an advertisement presented via a home screen, lock screen, or a screen saver), a book signing, promotion of a content item 118 via a trade show, and so on. The promotional activity may serve to make customers 110 aware of the content item 118 and/or to attempt to persuade customers 110 to acquire (e.g., purchase) the content item 118.

For a particular promotional activity for a content item 118, the baseline sales data 132 may indicate a baseline amount of sales expected for the content item 118 during a time period associated with the promotional activity. That is, based on the historical data 128 associated with the content item 118 or different, but related, content items 118, the service provider 102 may determine an expected amount of sales (e.g., units sold, revenue, profits, etc.) of the content item 118 for that time period.

Moreover, the content item sales data 134 may include an amount of actual sales of the content item 118 during the time period associated with the promotional activity for the content item 118. The amount of sales for the content item 118 may include a number of units sold, revenue, profits, etc., for the content item 118, which may correspond to customers 110 that have acquired the content item 118 from the service provider 102. In various embodiments, the actual sales of the content item 118 may be determined at predetermined intervals, such as every minute, hour, day, week, etc.

The financial impact data 136 may indicate a financial impact of the promotional activity with respect to the content item 118. That is, the service provider 102 may determine sales of the content item 118 that are likely attributable to the promotional activity for the content item 118. The financial impact of the promotional activity may be determined by subtracting the expected baseline amount of sales of the content item 118 from the actual sales of the content item 118, which results in additional sales of the content item 118 that likely resulted from the promotional activity for the content item 118. In certain embodiments, the financial impact 136 of the promotional activity may correspond to a time period determined for the promotional activity, such as a date range in which a coupon/deal for the content item 118 is valid, a date range in which an advertisement was presented to customers 110, and so on.

The expected financial impact data 138 may indicate an expected financial impact of a future promotional activity of the content item 118. For instance, for a future promotional activity that has yet to occur, the service provider 102 may determine an expected/predicted financial impact of the future promotional activity with respect to the content item 118. The expected/predicted financial impact of the future promotional activity may be based on historical data 128 that corresponds to related content items 118, prior promotional activities associated with the related content items 118, and a prior financial impact of the prior promotional activities with respect to the related content items 118.

In various embodiments, author data 140 may be visually and/or audibly presented to the author 106 via a corresponding author device 108 and the author interface 114. The author data 140 may include content items 118 that are offered by the service provider 102 on behalf of the author 106, promotional activities for those content items 118, actual sales of the content items 118, the financial impact of the promotional activities with respect to the content items 118, and/or the expected/future financial impact of future promotional activities with respect to the content items 118. Since the author data 140 may indicate whether certain promotional activities contribute to the additional sales of content items 118, the author 106 may determine whether the costs of publishing content items 118 with the service provider 102 is outweighed by the financial impact resulting from promotional activities performed by the service provider 102.

The service provider 102 may also determine and maintain customer data relating to customers 110 that have acquired (e.g., searched for, viewed, consumed, added to a saved-items list, purchased, etc.) content items 118 offered by the service provider 102 on behalf of authors 106. For instance, the customer data may include demographic data of the customers 110, which may include the age (or age range), gender, ethnicity, employment, income, location, genre preference, etc., associated with the customers 110. That is, for a customer 110 that has viewed, purchased, accessed, consumed, etc., a particular content item 118, the demographic data may indicate various information about that customer 110. As a result, the service provider 102 may determine the types of customers 110 (e.g., women, between the ages of 25-35, that live in or around Seattle, Wash.) that are acquiring and/or consuming the content item 118.

The customer data may also include purchase behavior data, which may indicate the extent to which customers 110 viewed, purchased, borrowed, etc., different content items 118. That is, for a particular customer 110, the service provider 102 may determine which content items 118 that the particular customer 110 viewed, purchased, borrowed, etc. On the other hand, for a particular content item 118, the service provider 102 may determine each customer 110 that viewed, purchased, borrowed, etc., that content item 118. Accordingly, the service provider 102 may determine the acquisition history associated with specific customers 110 and/or specific content items 118.

Moreover, the customer data may include reading behavior data. In particular, for a content item 118 acquired (e.g., purchased, borrowed, etc.) and/or accessed by a particular customer 110, the service provider 102 may determine various information relating to how the customer 110 consumed the content item 118. For instance, the service provider 102 may determine times in which the customer 110 accessed the content item 118, the frequency of access, the extent to which the customer 110 consumed the content item 118 (e.g., completed, abandoned, etc.), the extent to which the customer 110 highlighted or annotated the content item 118, portions of the content item 118 that were accessed, the order in which the customer 110 accessed/consumed the content item 118, the reading velocity of the customer 110, and so on. As a result, the service provider 102 may determine when, where, and how consumers 110 consumed various content items 118.

Based at least partly on the customer data, the service provider 102 may generate readership data. The readership data may refer to one or multiple content items 118 and may include the customer data, as well as trends or patterns determined based on the customer data. At least a portion of the readership data may be visually presented to the authors 106 via the author interface 114. More particularly, for one or more content items 118 associated with a particular author 106, the author 106 may access the author interface 114 via a corresponding author device 108 and view the readership data relating to the one or more content items 118. As a result, the author 106 may have access to meaningful data relating to their content items 118, such as the types of customers 110 that are acquiring and consuming the content items 118, and how such content items 118 are being consumed. In addition, the author 106 may compare first readership data of a first content item 118 with second readership data of a second content item 118 to determine variations in readership among multiple content items 118.

In various embodiments, each customer 110 may have a user account and/or a user profile associated with the service provider 102. Some of the customer data may be determined from the user profile of a customer 110, such as personal information (e.g., address, telephone number, etc.), the demographic data, interests or preferences of the customer 110, the purchase behavior data, the reading behavior data, and so on. Other data may be stored by the content server(s) 104 in association with the user profile of the customer 110. Such data may include the customer's 110 activity with respect to a retail site associated with the service provider 102, such as search history, purchase history, viewing history, a saved-items list (i.e., a "wish" list), reviews submitted by the customer 110, and so on. In other embodiments, the data may include customer devices 112 owned by, used by, or associated with the customer 110, subscriptions, associations with social networks, data collected from external sources other than the customer device 112 associated with the customer 110, amongst other data.

Accordingly, each customer 110 and/or customer device 112 may be associated with a user profile and/or a user account. Moreover, for the purposes of this discussion, the term customer 110 may also be referred to "customer profile" or "customer account," and vice versa. As a result, instead of, or in addition to, the customer data being associated with a customer 110, such customer data may also be associated with a customer profile and/or a customer account associated with the customer 110 and/or the customer device 112. Moreover, a particular customer account may be associated with multiple customer profiles. For instance, a particular customer account may be associated with an adult customer profile, a child customer profile, a teen customer profile, and so on.

As stated above, the authors 106 may provide the content items 118 to the service provider 102, possibly via the author interface 114. The service provider 102 may then offer the content items 118 to customers 110 on behalf of the authors 106. However, the service provider 102 need not offer the content items 118 to customers 110 or conduct/perform promotional activities with respect to the content items 118 in order to determine the financial impact of a promotional activity and/or the expected financial impact of a future promotional activity. That is, the content items 118 may be offered to customers 110 by the author 106 or by another entity (e.g., a publisher). Moreover, the promotional activities/future promotional activities may be conducted or performed by a different entity, such as an advertiser.

Figure 2:
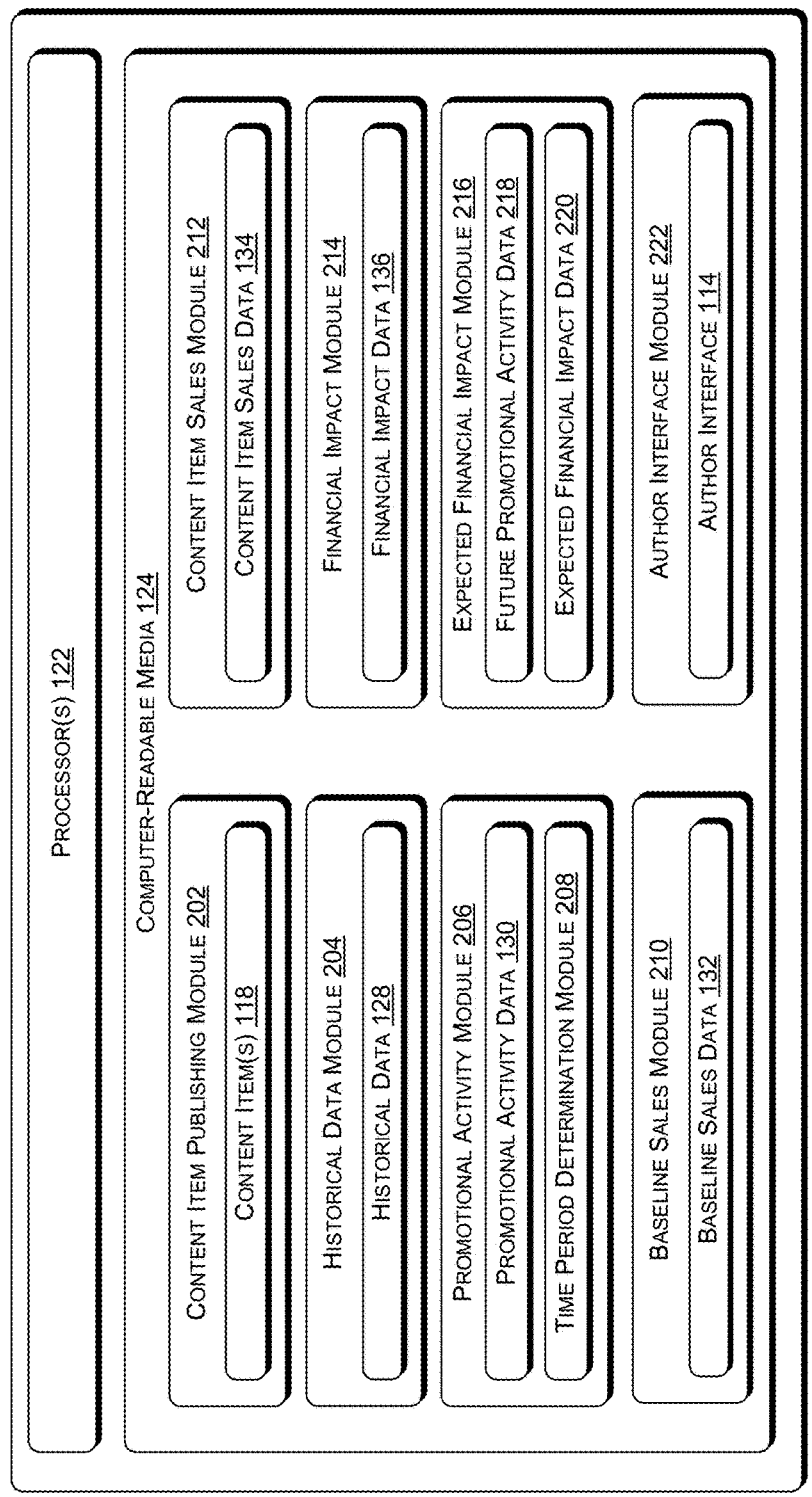
FIG. 2 illustrates an example diagram that includes a content server that determines a financial impact of a promotional activity associated with a content item.

FIG. 2 illustrates an example system 200 that depicts the content server(s) 104 illustrated in FIG. 1. As shown, the content server(s) 104 includes the one or more processor(s) 122, the computer-readable media 124, and the modules 126.

In various embodiments, a content item publishing module 202 may receive, determine, and/or maintain content items 118 associated with authors 106. Initially, the author 106 may provide one or more content items 118 to the service provider 102. For instance, the author 106 may transmit, upload, transfer, etc., an eBook to the service provider 102 via the author interface 114. The author interface 114 may be a self-service interface, website, portal, etc., that is accessible by the author 106 and that is associated with the service provider 102. Each author 106 may be associated with a separate author interface 114, such that, in response to the author 106 providing information that uniquely identifies the author 106 (e.g., a login, a password, etc.), the author interface 114 may be personalized to present information specific to that author 106. In other embodiments, an electronic version of the content item 118 may be provided via an e-mail message, a text/SMS message, a mobile application associated with the author device 108 of the author 106, or in any other manner. A physical copy of the content item 118 (e.g., a book) may also be provided via mail or delivered to the service provider 102 in a different manner (e.g., by hand, a delivery service, etc.).

Upon receiving the content item(s) 118, or a draft/manuscript of the content item(s) 118, the service provider 102 may publish the content item(s) 118, meaning that the service provider 102 may offer the content item(s) 118 for acquisition to the customers 110 on behalf of the author 106. For instance, the service provider 102 may offer the content item(s) 118 for sale via an electronic marketplace (e.g., a website, mobile application, etc.) that is accessible by the customers 110 via corresponding customer devices 112. The customers 110 may then elect to acquire (e.g., purchase, borrow, rent, etc.) the content items 118 that are being offered for acquisition by the service provider 102 on behalf of the author 106.

The service provider 102 may provide a number of merchandising and/or promotional services to authors 106 that publish/sell their content items 118 via the service provider 102. Such services include targeting advertising and advertising campaigns, which may include electronic advertisements/promotions presented to customers 110 via one or more websites, mobile applications, etc., associated with the service provider 102. The services may also include advertisements/promotions sent via e-mail messages, text messages, etc., as well as presence at industry trade shows and conferences, organized book signings, partnering with retail establishments (e.g., merchants) that offer content items 118 for sale, and so on. As a result of an author 106 publishing content items 118 with the service provider 102, the author 106 may receive the benefits resulting from such advertising/promotional services, possibly in exchange for a cost to the author 106. For instance, a percentage of revenue resulting from sales of content items 118 via the service provider 102 may be retained by, or provided to, the service provider 102. The service provider 102 may indicate, to the author 106, the advertising/promotional activities performed with respect to their content items 118, indicate the sales associated with these content items 118, and indicate the financial impact of the marketing/promotional services. That is, the service provider 102 may indicate sales of content items 118 that are directly attributable to such promotional activities, which may allow the author 106 to determine the additional sales that resulted from promotional activities associated with their content items 118.

In various embodiments, a historical data module 204 may receive, generate, and/or determine historical data 128. The historical data 128 may relate to content items 118 offered by the service provider 102 on behalf of authors 106, prior promotional activities performed with respect to those content items 118, customers 110 that interacted (e.g., searched for, viewed, consumed, purchased, etc.) with the content items 118, and/or the financial impact of the prior promotional activities with respect to the content items 118. For instance, for content items 118 previously offered to and/or purchased by customers 110, the service provider 102 may determine promotional activities performed with respect to those content items 118. As stated above, such promotional activities may have included electronic advertisements and/or promotions (e.g. online advertising campaigns), e-mail advertisements (e.g., targeted e-mail campaigns), advertisements/promotions presented via screen savers, lock screens, etc., blog posts, social media activity related to the content item 118, book signings, presence at trade shows, etc. Other activities that may be stored may include price changes and/or temporary price discounts for certain content items 118. As will be described in additional detail below, the service provider 102 may determine how such promotional and other activities had an influence on the sales of such content items 118. That is, the service provider 102 may determine the financial impact of the promotional activities, which may indicate the extent to which sales of content items 118 were attributable to the promotional activities associated with those content items 118. Moreover, and as stated above, the historical data 128 may include any type of information relating to the customers 110 that interacted with the content items 118, as well as the customer interaction with the content items 118.

The service provider 102 may determine, plan, coordinate, perform, etc. promotional activities for content items 118 it offers on behalf of authors 106. A promotional activity module 206 may perform such operations, and the promotional activities may be stored, or referred to, as promotional activity data 130. The promotional activities may be specific to a particular content item 118 and/or a particular author 106 that is associated with one or more content items 118. For instance, a promotional activity may include an e-mail campaign, an electronic advertisement that is presented via a website/mobile application associated with the service provider 102 and that is presented via customer devices 112 of customers 110, an electronic advertisement that is displayed via a home screen, lock screen, screensaver, etc., of a customer device 112 (e.g., an eBook reader device), a book signing, presence at industry trade shows, and so on.

For the purposes of this discussion, the promotional activities may be performed/conducted by the service provider 102. Alternatively, or in addition, the promotional activities for a content item 118 may be performed/conducted by the author 106 of the content item 118 or an entity that performs/conducts the promotional activities on behalf of the author 106 (e.g., an advertising agency). For instance, the author 106 may elect to promote his/her content item 118 via a book signing, a social network, an electronic advertisement, an e-mail campaign, and so on. The author 106 may convey the promotional activities that he/she performs/conducts to the service provider 102, possibly via the author interface 114. Accordingly, the service provider 102 may then be aware of such promotional activities and may still be able to determine, for a particular promotional activity for a content item 118, the time period for the promotional activity, the baseline amount of sales expected for the content item 118 during that time period, the actual amount of sales of the content item 118 during the time period, and/or a financial impact of the promotional activity. If the author 106 intends to conduct future promotional activities for a content item 118, the author 106 may provide this information to the service provider 102, which may allow the service provider 102 to predict an expected financial impact of the future promotional activities.

In various embodiments, a time period determination module 208 may determine a time period or duration associated with a particular promotional activity. In order to determine additional sales of a content item 118 that are attributable to, or that were caused by, a particular promotional activity, the service provider 102 may have to determine a time period associated with the promotional activity, where sales of the content item 118 during the time period are determined to be attributable to the promotional activity. A determination of a time period for a promotional activity may be dependent upon the type of the promotional activity. In certain embodiments, the time period for a promotional activity associated with a content item 118 may be the duration of time in which the promotional activity is available and/or the duration of time in which the promotional activity is presented to customers 110. For instance, for an e-mail marketing campaign for a content item 118 that is provided to customers 110 for a specified amount of time (e.g., two weeks), the time period for that promotional activity will likely be two weeks. The service provider 102 may designate sales of the content item 118 during that time period to that promotional activity. In other embodiments, an electronic advertisement for a content item 118 may have an expiration date. As a result, the time period for that promotional activity may be a duration of time beginning at a first time at which the electronic advertisement was offered to customers 110 and ending at a second time corresponding to when the electronic advertisement expires. Sales for the content item 118 received during the time period and/or sales for the content item 118 in which customers 110 clicked on or referenced the electronic advertisement may be attributed to that promotional activity.

For other promotional activities, it may be more difficult to determine the time period associated with the promotional activity. In some instances, the service provider 102 may determine the start of the time period. For instance, for a book signing for the content item 118 or an industry trade show that features the content item 118 (or its author 106), the beginning of the time period may correspond to the time of the book signing/trade show, or the time at which customers 110 were exposed to the content item 118 while attending the book signing/trade show. However, since such promotional activities may not have a fixed end date, it may be difficult for the service provider 102 to determine whether sales of the content item 118 resulted from the particular promotional activity, or whether the sales were ordinary sales that would have occurred regardless of the promotional activity (e.g., a customer 110 purchased the content item 118 because he/she liked the content item 118).

Accordingly, an end point of the time period may be based on the historical data 128 discussed above. In particular, the service provider 102 may identify one or more content items 118 that are related to the content item 118, which may be referred to herein as related content items 118. The related content items 118 may be content items 118 from the same author 106, content items 118 from a similar author 106, content items 118 in the same genre (e.g., sci-fi, romance, etc.) as the content item 118, content items 118 in the same series as the content item 118, and so on. The service provider 102 may also determine that two content items 118 are related or similar if the content items 118 were acquired (e.g., purchased, rented, borrowed, etc.) or consumed by the same customer 110, or if the content items 118 were previously acquired at the same time or in the same transaction. The service provider 102 may analyze prior promotional activities associated with the related content items 118 and determine sales of the related content items 118 that were in addition to the typical/ordinary sales of the related content items 118. The end of the time period for those related content items 118 may be when the amount of sales following the prior promotional activities decreased to the typical/ordinary amount of sales for the related content items 118. The service provider 102 may consider prior promotional activities that are the same as, or are at least similar to, the promotional activity for the content item 118.

As an illustrative example, assume that the service provider 102 is facilitating a book signing for an author 106 and a corresponding content item 118 (e.g., a book, eBook, and/or audible book). Although the start of the time period for that promotional activity may be the time/date of the book signing, or possibly the time/date in which the book signing was advertised/promoted to customer 110, it may be difficult to determine the end of the time period. That is, after the book signing, it may be difficult to determine which sales of the content item 118 are attributable to the book signing, and the duration of time subsequent to the book signing in which sales of the content item 118 actually resulted from the occurrence of the book signing. The service provider 102 may leverage the historical data 128 to determine the end period for this promotional activity.

For instance, the service provider 102 may determine two related content items 118, which may be referred to as a first content item 118 and a second content item 118. Assume that the service provider 102 coordinated a book signing for an author 106 of the first content item 118, but did not conduct a book signing, or any other promotional activity, during that same time for the second content item 118. Starting at the time of the book signing, the service provider 102 may determine an increased amount of sales of the first content item 118, which is presumably due to the occurrence of the book signing. On the contrary, the sales of the second content item 118 may remain constant. After the initial increase in sales of the first content item 118, the amount of sales of the first content item 118 may decrease or decay over time (e.g., one week, one month, etc.) until the sales of the first content item 118 return to its ordinary/custom amount. The service provider 102 may also determine when the sales of the first content item 118 return to similar levels as that of the second content item 118. When this occurs, the service provide 102 may determine that subsequent sales of the first content item 118 are not likely to be caused by the book signing. This time may correspond to the end of the time period corresponding to the book signing. For a current content item 118 that is related to the first content item 118, and that is associated with a current book signing that is attended by the author 106 of the current content item 118, the service provider 102 may determine that the end of the time period of the current book signing will be similar to that of the first content item 118 (e.g., one week, one month, etc., after the book signing).

The service provider 102 may generate or develop a model that determines or predicts the end time for a time period associated with a promotional activity. The model may be dependent upon the type of the content item 118 and/or the type of the promotional activity that is to be conducted with respect to the content item 118. Accordingly, the time period for different promotional activities may vary based on the particular content item 118 and the type of the promotional activity (e.g., book signing, trade show, e-mail campaign, electronic advertising campaign, etc.).

In various embodiments, a baseline sales module 210 may determine or generate baseline sales data 132, which may indicate a baseline amount of sales for a particular content item 118. Based on historical data 128 associated with the content item 118 and/or historical data 128 associated with related content items 118, the service provider 102 may determine the typical amount of sales for the content item 118 at a particular time. The baseline amount of sales may refer to the expected and typical amount of sales of the content item 118 (and/or the author 106) assuming that the service provider 102 is not currently conducting promotional activities for the content item 118. That is, the baseline amount of sales for the content item 118 may be based on historical sales data for that content item 118, historical sales data for other content items 118 of the same author 106, and/or historical sales data for related content items 118 of different authors 106 (e.g., same genre, etc.). The baseline amount of sales for a content item 118 may vary based on one or more factors, such as the time of year, the type of content item 118 (e.g., sci-fi, romance, non-fiction, etc.), the time since the content item 118 was published, released, and/or promoted, and so on. That is, the baseline amount of sales for a content item 118/author 106 may be cyclical and/or seasonal.

Moreover, a content item sales module 212 may determine the content item sales data 134, which may indicate actual sales for a content item 118 of an author 106, and any other content item 118 offered by the service provider 102 on behalf of authors 106. The content item sales data 134 may indicate a number of units of the content item 118 sold, revenue resulting from such sales, profits from the sales, and so on. The sales data for a particular content item 118 may be of any granularity, so the service provider 102 may view the sales data at any time intervals (e.g., every minute, hourly, daily, weekly, monthly, etc.). Moreover, the sales data may be specific to a single content item 118, content items 118 associated with a particular author 106, content items 118 within a particular genre, and so on. The sales data may also identify the customers 110 that acquired/purchased the content items 118, as well as information relating to the customers 110. Moreover, the service provider 102 may determine the amount of sales for a content item 118 for n time interval, such as the amount of sales for a content item 118 during a time period associated with a particular promotional activity associated with the content item 118.

Upon determining the sales data for a particular content item 118, and possibly for a certain duration of time, the service provider 102 may utilize one or more techniques, algorithms, software, etc., to smooth the sales data. In some instances, the sales data may include at least some noise due to the temporal and/or seasonal aspects of the sales data. Accordingly, the service provider 102 may take into account noisy aspects of the data by taking into account expected sales decay (e.g., a gradual decrease in sales after a promotional activity), seasonal sales trends, cyclical trends relating to sales of the content item 118, and so on.

In various embodiments, a financial impact module 214 may generate, determine, and/or store financial impact data 136 associated with a promotional activity for a particular content item 118. That is, for a period of time associated with a promotional activity for a content item 118, the financial impact module 214 may determine or estimate a financial impact of the promotional activity with respect to the content item 118. The financial impact may indicate a number of additional sales of the content item 118 that are attributable to, and/or that resulted from, the promotional activity. That is, the additional sales of the content item 118 via the service provider 102 may not have occurred but for the promotional activity that featured or promoted the content item 118.

More particularly, the financial impact of a promotional activity associated with a content item 118 may be based at least partly on the expected baseline amount of sales for the content item 118 and the actual amount of sales of the content item 118. In some embodiments, the expected baseline amount of sales and the actual amount of sales may be for a time period determined for the promotional activity. The financial impact of the promotional activity (e.g., the additional amount of sales that were likely caused by the promotional activity) may be determined by subtracting the baseline amount of sales for the content item 118 from the actual amount of sales for the content item 118. The resulting amount of sales (e.g., the delta between the baseline amount of sales and the actual amount of sales for the content item 118) may be referred to additional sales that would likely not have occurred but for the occurrence of the promotional activity.

A determination of whether sales of a content item 118 are attributable to a particular promotional activity may be based on the type of promotional activity. For instance, for an e-mail marketing campaign for a content item 118 where e-mail messages are targeted and sent to customers 110, the sale of the content item 118 may be attributed to the e-mail marketing campaign if the customer 110 that purchased the content item 118 selected/clicked on a link include in the e-mail message. That is, if the customer 110 received the e-mail message, selected/clicked a link included in the e-mail message, and subsequently purchased the content item 118, it may be determined that the sale of the content item 118 is attributable to the promotional activity. Similar reasoning applies if the promotional activity for the content item 118 is some type of electronic advertisement, such as an advertisement presented via a web site, a mobile application, a customer device 112 (e.g., an eBook reader device), and so on. If the customer 110 selected the electronic advertisement (e.g. clicked on a link, interacted with a touch screen of a customer device 112 at a location at which the advertisement was displayed) and subsequently purchased the content item 118, the service provider 102 may determine that there is a high likelihood that the sale of the content item 118 resulted from that promotional activity.

Provided that the promotional activity is a book signing attended by the author 106 of the content item 118, a determination of whether sales of the content item 118 are attributable to the book signing may be based on geographic locations of customers 110 that purchased the content item 118 subsequent to the book signing. For instance, assuming that the book signing occurred at a particular physical location, the service provider 102 may determine if sales of the content item 118 are associated with customers 110 in geographic locations that are in proximity to the physical location, such as geographic locations within a predetermined distance (e.g., five miles, 10 miles, etc.) from the physical location. Since customers 110 would attend a book signing in person, if the service provider 102 determines an increase in sales of the content item 118, and that those sales correspond to customers 110 in relative close proximity to the physical location of the book signing, the service provider 102 may infer that those additional sales of the content item 118 are likely to be attributable to the book signing.

In other embodiments, the promotional activity associated with the content item 118 may be associated with an identifier that is maintained by the service provider 102 and that is provided to customers 110. Then, when the customer 110 purchases the content item 118, he/she may also provide the identifier of the promotional activity. If this occurs, that sale of the content item 118 may be determined to be attributable to that particular promotional activity. Whether a sale of the content item 118 resulted from the promotional activity may also be based on a behavior of the customer 110 that purchased the content item 118. That is, past/current locations of the customer 110, a search behavior of the customer 110, websites/webpages visited by the customer 110, advertisements viewed by the customer 110, etc., may indicate that the customer 110 viewed or attended a promotional activity prior to purchasing the content item 118. For instance, if the service provider 102 determined that the customer 110 visited a webpage in which an advertisement for the content item 118 was displayed prior to purchasing the content item 118, the service provider 102 may attribute that sale of the content item 118 to the promotional activity. Moreover, based on location data received from a customer device 112 associated with the customer 110, or social network data of the customer 110 (e.g., a check-in, comment, post, etc.), the service provider 102 may determine that the customer 110 was in close proximity to a promotional activity prior to purchasing the content item 118. That is, if the customer 110 was in close proximity to a book signing of the author 106 of the content item 118, or a trade show in which the content item 118 and/or the author 106 was featured, the service provider 102 may determine that the promotional activity likely caused the customer 110 to purchase the content item 118.

In various embodiments, the financial impact of a promotional activity with respect to a content item 118 may be determined using various techniques. For instance, one or more algorithms, predictive models, and/or machine learning techniques may be utilized. Examples of predictive models and other techniques that may be used may include one or more classifiers, include group method of data handling, Naïve Bayes, k-nearest neighbor algorithm, majority classifier, support vector machines, random forests, boosted trees, Classification and Regression Trees (CART), neural networks, ordinary least square, regression analysis, and so on. Moreover, and for the purpose of this discussion, machine learning may refer to one or more programs that learns from the data it receives. For example, a machine learning mechanism/technique may build, modify, or otherwise utilize a data model that is created from example inputs and makes predictions or decisions using the data model. Furthermore, a machine learning technique may output a confidence value indicative of a likelihood that sales of a content item 118 are attributable to a particular promotional activity. Examples of the machine learning techniques may include, among others, supervised learning, unsupervised learning, semi-supervised learning, classification analysis, regression analysis, clustering, etc. Despite the foregoing, it is contemplated that any other types of algorithms or techniques may also be used.

In various embodiments, an expected financial impact module 216 may generate, determine, and/or maintain future promotional activity data 218 and expected financial impact data 220. The future promotional activity 218 may indicate future promotional activities for a content item 118 and/or a corresponding author 106 that have yet to occur. Moreover, the expected financial impact data 220 may indicate an expected financial impact of the future promotional activity with respect to content item 118. The expected financial impact of the future promotional activity may correspond to an expected number of sales of the content item 118 that are likely to occur as a result of conducting the future promotional activity. That is, the service provider 102 may forecast an amount of additional sales of the content item 118 that would result from different promotional activities. Moreover, the expected financial impact may be determined for different types of promotional activities (e.g., email campaign, electronic advertisements, a book signing, presence at a trade show, etc.) that could be conducted with respect to the content item 118.

To determine the expected financial impact of a future promotional activity with respect to a content item 118, the service provider 102 may leverage the historical data 128 and/or the machine learning techniques/predictive models discussed above. In some embodiments, the service provider 102 may determine the prior financial impact of prior promotional activities for different content items 118. That is, the service provider 102 may build a data set that includes sets of data pairs that include a prior promotional activity for a content item 118 and a financial impact of the prior promotional activity, which may be represented by an amount of additional sales that are attributable to, or were caused by, the prior promotional activity. The sets of data pairs may serve as training data and/or inputs for the machine learning model/mechanism. Using the training data, the machine learning techniques described herein may identify features that are predictors or indicators of whether a promotional activity for a content item 118 will result in additional sales (e.g., a positive financial impact).

In various embodiments, the features may include characteristics of the different promotional activities and/or the content items 118 that were subject to the promotional activities. With respect to the promotional activities, such characteristics may include the type of the promotional activity. Based on the historical data 128 and the machine learning techniques, it may be determined that certain promotional activities (e.g., e-mail campaigns, electronic advertisements, book signings, etc.) are more likely to cause an additional amount of sales of the content item 118, whereas other promotional activities (e.g., presence at an industry trade show) are less likely to cause an increase in sales of the content item 118. Characteristics of the content items 118 may include a genre of content items 118. For instance, promotional activities for certain genres of content items 118 (e.g., sci-fi) may be more likely to cause an increase in sales for the content item 118, whereas other genres (e.g., romance) may be less likely to cause an increase in sales. Other characteristics associated with the content item 118 may include whether the content item 118 is part of a series of content items 118, the particular author 106, the readership of the author 106 (e.g., demographics, reading behavior, etc., of customers 110 that typically consume content items 118 of the author 106), historical sales of the content item 118, the overall customer base of the genre of the content item 118, and so on. That is, certain characteristics of promotional activities and/or content items 118 may have a greater impact on the sales of content items 118, and thus may serve as better predictors of whether a future promotional activity is likely to cause a positive financial impact for the content items 118.

Based on the features and/or characteristics, the service provider 102 may generate and/or maintain a predictive model that can be used to determine whether a particular promotional activity is likely to cause an increase in sales for a particular content item 118. Since the service provider 102 may be able to predict an expected financial impact of a future promotional activity with respect to a content item 118 of an author 106, the service provider 102 may be able to determine which promotional activities should be conducted for the content item 118. Such information may be provided to the author 106, and the author 106 may indicate which promotional activities he/she would like to move forward with. Based on the expected financial impact of various promotional activates for the content item 118, the author 106 may elect to engage in certain promotional activities that are likely to result in additional sales of the content item 118, and refrain from engaging in other promotional activities that are not likely to result in amount of additional sales that outweighs the costs/expense of performing those promotional activities.

In various embodiments, the service provider 102 may maintain, or at least be associated with, one or more servers (e.g., the content server(s) 104), data structures, databases, data warehouses (e.g., Amazon Redshift, Amazon Simple Storage Service (S3), etc.) etc., that store the historical data 128, and that allow for analysis of the historical data 128. For each content item 118, the service provider 102 may maintain promotional activities performed for the content item 118, sales of the content item 118, information about customers 110 that acquired the content item 118, and/or the financial impact of such promotional activities. These systems may store this data in an unstructured and/or a structured/machine-readable manner, such that queries may be run on the data. Moreover, one or more components, algorithms, software, programming models, computing frameworks, etc. (e.g., Apache Spark, MapReduce, etc.) may process large batches of the data in order to generate the financial impact data 136 and/or the expected financial impact data 220.

The computer-readable media 124 may also maintain an author interface module 222 that causes the author data 140 to be presented via the author interface 114, which may be accessed by the authors 106 via corresponding author devices 108. As will be discussed in greater detail with respect to FIG. 3, with respect to a particular author 106, the author interface 114 may display various types of information relating to information about the author 106, content items 118 offered by the service provider 102 on behalf of the author 106, promotional activities performed or that will be performed with respect to the author 106 (and/or corresponding content items 118), sales data relating to the content items 118, the financial impact of those promotional activities, and/or the expected financial impact of promotional activities that have yet to occur.

Figure 3:
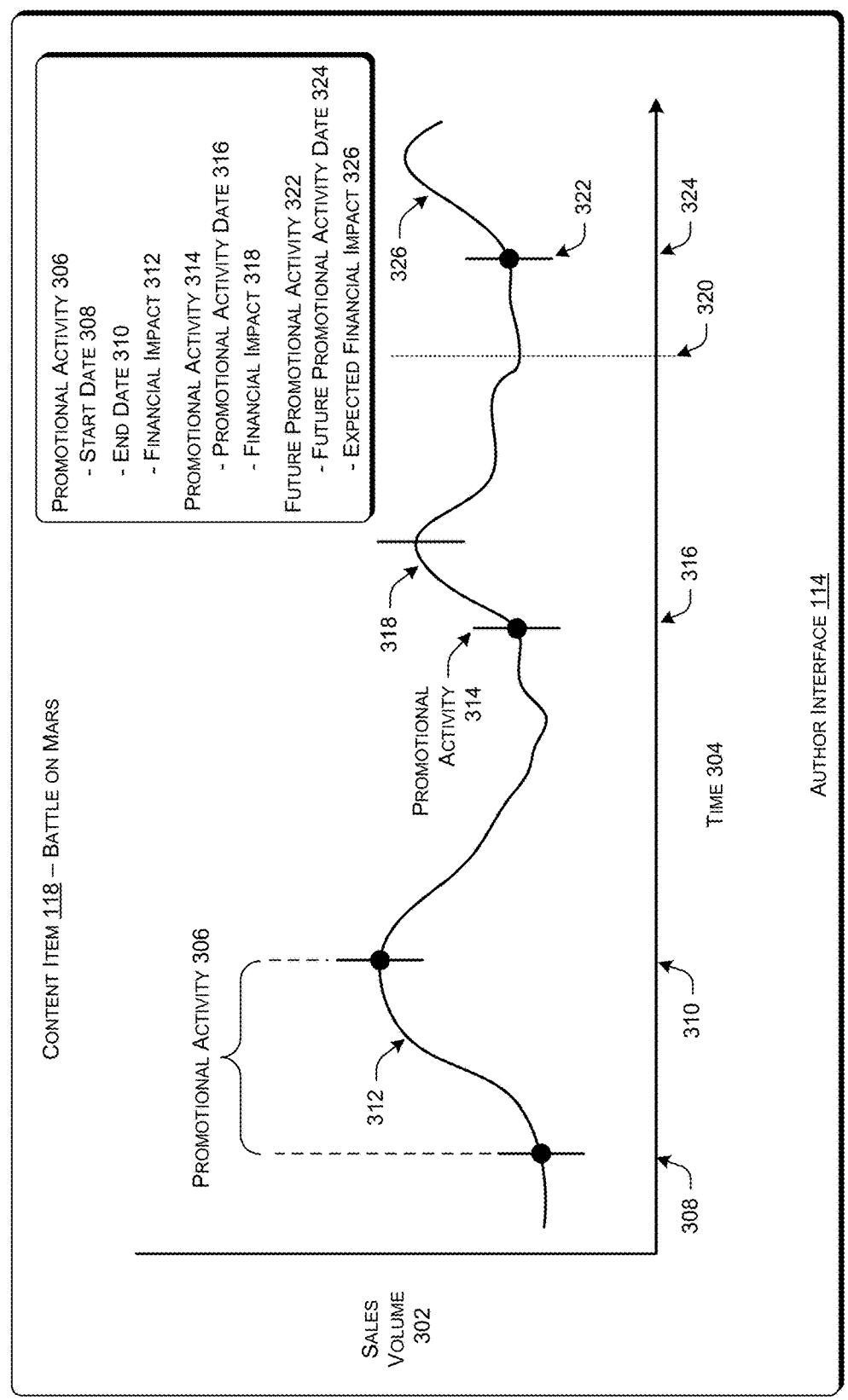
FIG. 3 illustrates an example diagram for visually presenting, via an author interface, a financial impact of a promotional activity associated with a content item.

FIG. 3 illustrates a diagram 300 of an example author interface 114 that is accessible to an author 106 and that is associated with the service provider 102. The author interface 114 may be any website, portal, self-service interface, mobile application, etc., that allows the authors 106 to provide content items 118 to the service provider 102 and/or allows the authors 106 to view data (e.g., author data 140) regarding content items 118 that the service provider 102 has offered to customers 110 on behalf of the authors 106. In various embodiments, the author interface 114 may be accessible to authors 106 that have a customer account or customer profile with the service provider 102. Upon providing information that uniquely identifies a particular author 106 (e.g., a login, a password, and/or other security information), the author interface 114 may display data that is specific to that particular author 106 and the content items 118 of that author 106. The author interface 114 may have any number of sections, windows, pages, tabs, etc., that visually presents the author data 140 to the authors 106, such as by visually presenting the data using text, graphics, images, charts, maps, and so on.

In various embodiments, the author interface 114 may include one or more calendars, timelines, etc., that display past, current, and/or future promotional activities relating to content items 118 of the author 106. As a result, the author 106 may coordinate his/her own marketing efforts. Moreover, the author interface 114 may present the financial impact of such promotional activities (e.g., additional sales of a content item 118 that are likely attributable to a promotional activity), thereby allowing the author 106 to determine whether the author 106 is benefitting by publishing his/her content items 118 with the service provider 102.

Accordingly, the author interface 114 may serve as a consolidated view of marketing/promotional activities that are associated with the content items 118 of the author 106 and that are performed by the service provider 102 on behalf of the author 114. The author interface 114 may include a time period for the promotional activities, such as start and end times/dates, as well as metrics for the promotional activities. Such metrics may include the number of e-mail advertisements sent, number of impressions served, number of attendees at a book signing or trade show, and so on. Moreover, each promotional activity may include a corresponding financial impact, which would be an estimate of the extent to which the promotional activity impacted the sales of the content item 118 over a baseline sales amount for the content item 118. In addition to presenting the financial impact of prior promotional activities, the author interface 114 may present an expected financial impact for future promotional activities that have yet to occur. The expected financial impact may represent a predicted amount of additional sales of a content item 118 as a result of a future promotional activity that is in addition to the expected baseline amount of sales for that content item 118. For instance, the author interface 114 may specify that the author 106 has a book signing tour scheduled for October and, based on historical data 128 associated with the author 106 and/or content items 118 of the author 106, the service provider 102 expects a 25% increase in sales of the content item 118 for October. The increase in sales may result from the book signing tour and may include customers 110 purchasing the content item 118 (e.g., the book) from locations visiting by the author 106 on the book signing tour and/or the customers 110 purchasing the book via the service provider 102.

As illustrated in FIG. 3, the author interface 114 may present a graph or timeline that relates to a particular content item 118, which is entitled "Battle on Mars". The graph/timeline illustrates the sales volume 302 of the content item 118 (the y-axis) versus time 304 (the x-axis). Based on the graph/timeline, the author 106 may determine the actual amount of sales for the content item 118. The graph/timeline also illustrates various promotional activities, such as promotional activity 306, which may have a start date 308 and an end date 310. For instance, the promotional activity 306 may be an e-mail marketing campaign for the content item 118 in which e-mails are provided to customers 110 from the start date 308 to the end date 310. In addition, the author interface 114 may indicate a financial impact 312 of the promotional activity 306 with respect to sales of the content item 118. Here, beginning at the start date 308, the amount of sales of the content item 118 appears to increase, which is represented by the line having a positive slope. Following the end date 310 of the promotional activity 306, the sales volume 302 of the content item 118 begins to gradually decrease. Since sales of the content item 118 increased between the start date 308 and the end date 310 of the promotional activity 306, it appears that the promotional activity had a positive financial impact 312, meaning that such sales of the content item 118 are likely be attributable to the promotional activity 306.

The author interface 114 may also present multiple promotional activities of for the content item 118, such as promotional activity 314. For the purposes of this discussion, assume that the promotional activity 314 is on a single date, such as a book signing by the author 106 or presence at an industry trade show. As a result, the promotional activity 314 may have a promotional activity date 316 and the author interface 114 may illustrate a financial impact 318 of the promotional activity 314. As shown, after the promotional activity 314, the amount of sales of the content item 118 increases, indicating that the promotional activity 314 resulted in additional sales of the content item 118. If the amount of sales of the content item 118 did not increase after the promotional activity date 316, it may be determined that the promotional activity 316 likely did not cause additional sales of the content item 118.

Accordingly, the author interface 114 may be a timeline or graph that visually depicts the sales of a content item 118, include an aggregated amount of sales or sales for a certain time period. The timeline/graph may also be annotated with past, current, and/or future promotional activities for the content item 118, as well as information relating to those promotional activities. As a result, by viewing the timeline/graph via the author interface 114, an author 106 may determine whether certain promotional activities correspond to an increase in sales of the content item 118. Moreover, instead of displaying a single point representing a promotional activity, the author interface 114 may illustrate a time period corresponding to the promotional activity, where the time period indicates when the promotional activity was active. For a promotional activity that does not have a natural ending, such as a book signing, the author timeline/graph may indicate sales of the content item 118 after a time/date of the book signing. In other embodiments, the author interface 114 may include a bar graph, which may be color-coded, to indicate sales that resulted from the promotional activity. For instance, for a particular time period associated with the promotional activity, the bar graph may illustrate an expected baseline amount of sales for the content item 118 during the time period and the actual amount of sales of the content item 118 during that time period. The difference between the two may represent the financial impact of the promotional activity.

As stated above, the graph/timeline may include future promotional activities that have yet to occur. As a result, the graph/timeline may extend past the current date and can show future promotional activities scheduled for a content item 118, as well as the expected financial impact of those future promotional activities. Instead of, or in addition to, presenting the expected financial impact of such future promotional activities, the graph/timeline may present historical data 128 indicative of similar/related content items 118 (e.g., content items 118 by the same author 106, in the same series, in the same genre, etc.), similar promotional activities previously conducted for the similar/related content items 118, and the financial impact (e.g., the additional sales) that resulted from those promotional activities. Accordingly, instead of predicting the financial impact of future promotional activities for the author's 106 content items 118, the service provider 102 may allow the author 106 to draw his/her own conclusions regarding future promotional activities associated with content items 118 of the author 106 and whether they are likely to result in additional sales of the content item 118.

For instance, the author interface 114 may display a current date 320, which is represented by a dotted, vertical line. Information presented to the right of the dotted line representing the current date 320 may correspond to future activities/data. As shown, the author interface 114 may display a future promotional activity 322, which may correspond to a promotional activity with respect to the content item 118 that has yet to occur. In addition, the author interface 114 may display a future promotional activity date 324 that corresponds to the future promotional activity 322. The future promotional activity date 324 may represent a date in which the future promotional activity 322 is scheduled to occur, or an arbitrary future date. As set forth herein, the service provider 102 may determine an expected financial impact 326 of the future promotional activity 322, and display the expected financial impact 326 via the author interface 114. As a result, the author 106 may determine how future promotional activities could impact the future sales of a content item 118. That is, the author 106 may determine an additional amount of sales of the content item 118 that are likely to occur as a result of the future promotional activity 322.

In addition, the author interface 114 may include an author information section that indicates various types of information about the author 106 and the content items 118 that are associated with the author 106. For instance, the author information may include an identity of the author 106, a username or account name, the titles of content items 118 that are associated with that author 106, and other relevant information. For instance, for a particular content item 118/title, the author interface 114 may include any type of information about that content item 118, such as the number of units sold, sales revenue, a sales curve that corresponds to sales of the content item 118, profits, royalties, and/or a royalty curve that shows the royalties to be received by the author 106. Via the author interface 114, the author 106 may select the title of a content item 118 in order to view information related to that content item 118.

In addition, the author interface 114 may depict the reader composition for the content item 118. The reader composition may include age data, gender data, location data, and/or genre data. For instance, the age data may indicate the age or age ranges of customers 110 that interacted with (e.g., acquired, accessed, etc.) the content item 118. That is, it may be shown that certain age groups (e.g., 15-24, 35-44, etc.) acquired/accessed the content item 118 more than other age groups. Moreover, the gender data may indicate variation in gender with respect to customers 110 that acquired and/or accessed the content item 118. The location data may indicate physical locations of customers 110 that acquired/accessed the content item 118, as well as locations at which the content item 118 was accessed. Lastly, for the customers 110 that acquired/accessed the content item 118, the genre data may indicate the genres of content items 118 that those customers 110 typically prefer. For instance, it may be shown that more of the customers 110 typically read books in the sci-fi genre, as opposed to the romance genre. Moreover, the readership composition may include any other data regarding the customers 110 that purchased, borrowed, rented, accessed, viewed, consumed, read, etc., the content item 118.

The author interface 114 may also present readership behavior associated with customers 110, which may correspond to data regarding customer acquisition and/or consumption of the content item 118. The readership behavior may be determined based on the customer device 112 used to access the content item 118 and/or a mobile application that resides on the customer device 112 and that is used to access the content item 118. One or both of the customer device 112 or the mobile application (e.g., a mobile application dedicated to reading eBooks) may be associated with the service provider 102. In some embodiments, the readership behavior data may include acquisition data regarding the content item 118. The acquisition data may indicate the extent to which customers 110 searched for, viewed, selected, added to a saved-items list, rented, borrowed, and/or purchased the content item 118. The acquisition data may also indicate the time and location in which the customers 110 interacted with the content items 118. Accordingly, the acquisition data 314 may indicate patterns relating to customers 110 that acquired the content item 118.

Moreover, the author interface 114 may display access data associated with the content item 118, which may represent the extent to which the customers 110 accessed the content item 118. In particular, for a particular customer 110, the access data may indicate times at which the content item 118 was accessed by the customer 110, the amount of time that the customer 110 accessed the content item 118 for each session in which the content item 118 was accessed, a location of the customer 110 when the content item 118 was accessed, a frequency of access of the content item 118, specific portions of the content item 118 (e.g., pages, chapters, etc.) that were accessed, the order in which portions of the content item 118 were accessed, an amount of time that each portion was accessed, a total amount of time in which the customer 110 accessed the content item 118, and so on. Therefore, the access data may indicate patterns that relate to how, when, and where customers 110 typically access the content item 118.

Moreover, completion data associated with the content item 118 may correspond to the extent to which customers 110 that acquired and/or accessed the content item 118 actually finished the content item 118. For the purposes of this discussion completing a content item 118 may indicate that the customer 110 accessed each page, chapter, etc., of the content item 118, or that the customer 110 accessed a threshold number of pages, chapters, portions, etc., of the content item 118. The completion data may be represented by a ratio, percentage, or total number of customers 110, and the completion data may indicate an amount of time (e.g., minutes, hours, weeks, etc.) that the customer 110 took to complete the content item 118. The completion data may indicate patterns regarding the completion of the content item 118 by different customers 110.

In various embodiments, the readership behavior may include abandonment data, which may indicate an extent to which the customers 110 abandoned the content item 118. That is, the abandonment data may include a total number of customers 110, ratio, or percentage that represents the extent to which customers 110 that acquired/accessed the content item 118 also did not complete the content item 118. For each customer 110, the abandonment data may indicate a point (e.g., page number, chapter number, etc.) in which the customers 110 abandoned the content item 118 and/or the amount of time the customers 110 spent accessing/consuming the content item 118 prior to abandoning the content item 118. Based on the extent to which customers 110 completed and/or abandoned the content item 118, the service provider 102 may determine abandonment patterns of customers 110 with respect to the content item 118.

In addition, mark-up data may indicate an extent to which customers 110 selected, highlighted, annotated, etc., (e.g., marked-up) content included within the content item 118. For instance, the service provider 102 may track portions of the content item 118 (e.g., an eBook) that the customers 110 select or highlight. The service provider 102 may also track annotations to portions of the content item 118. The mark-up data may also indicate times at which the mark-ups occurred, as well as locations of the customer 110 when the mark-ups were performed. Based on mark-ups of the content item 118 by multiple customers 110, the service provider 102 may determine trends or patterns regarding which portions of the content item 118 are most frequently, or less frequently, marked up.

The readership behavior may also include velocity data, which may indicate the velocity (e.g., speed, rate, etc.) in which customers 110 consume or read the content item 118. The velocity data may be represented by the number of pages or chapters read per unit of time (e.g., minutes, hours, etc.). Moreover, the velocity data may indicate reading velocity patterns with respect to the content item 118, such as the average or mean reading velocity associated with the content item 118.

In certain embodiments, the readership behavior may be aggregated or broken down for different groups of customers 110. As an illustrative example, assume that the service provider 102 has determined mark-up data for customers 110 that have accessed the content item 118. However, in addition to determining and presenting the mark-up data for all customers 110 that have accessed the content item 118, the service provider 102 may determine/present the mark-up data for different groups of customers 110, such as customers 110 of a certain demographic (e.g., ages 25-34, women, located in Seattle, Wash., etc.). Moreover, the readership behavior may be determined for multiple different content items 118 for a particular author 106.

In certain embodiments, the author interface 114 may present the readership variation between at least two different content items 118 of a particular author 106. In particular, the readership variation may visually display the similarities and/or differences of customers 110 and customer interaction with respect to a first title and a second title of the author 106, where the first title and the second title correspond to different content items 118 of the author 106. The readership variation may indicate how the customers 110 that acquired/accessed the first title and the customers 110 that acquired/accessed the second title differ. For instance, the readership variation may indicate that the same or similar customers 110 acquired/accessed both the first title and the second title. However, the readership variation may also indicate how readership of the author 106 has evolved from the first title to the second title. For instance, the readership variation may indicate that the customers 110 that acquire/access content items 118 of the author 106 have shifted from customers 110 who typically prefer a first genre (e.g., romance) to customers 110 who typically prefer a second genre (e.g., sci-fi). Further, the demographics of the customers 110 may also have shifted, such as from a first age group to a second age group, from male to female, and so on.

Moreover, for customers 110 that have acquired/accessed a content item 118 of the author 106, the service provider 102 may determine and display readership information with respect to the total number of readers/customers 110 associated with the service provider 102. For instance, for a certain group of customers 110 of the service provider 102 (e.g., romance genre, ages 25-34, etc.) the service provider 102 may determine and illustrate a fraction of that group of customers 110 that acquired/accessed the content item 118. That is, if the service provider 102 has a total of 10,000 readers in the romance genre and 1,000 romance readers acquired/accessed the content item 118, the service provider 102 may indicate the number of readers customers 110 that acquired/accessed the content item 118, or a fraction/ratio that represents those customers 110 (e.g., $\frac{1}{10}$ or 10%). As a result, for different groups of customers 110, the author 106 may view its readership in view of the total readership of the service provider 102.

In various embodiments, the author interface 114 may illustrate readership growth/loss with respect to the author 106. In particular, the service provider 102 may determine readers gained and/or non-returning readers with respect to the author 106. More particularly, the service provider 102 may compare the customers 110 that have acquired/accessed a first content item 118 of the author 106 to the customers 110 that have acquired/accessed a second content item 118 of the author 106 to determine the overlap of the customers 110. As a result, the service provider 102 may determine customers 110 that did not acquire/access the first content item 118, but that acquired/accessed the second content item 118 (e.g., readers gained). The service provider 102 may also determine customers 110 that acquired/accessed the first content item 118, but that did not acquire/access the second content item 118 (e.g., non-returning readers). The service provider 102 may display the identity of, or the number of, readers gained and non-returning readers. In other embodiments, the service provider 102 may determine returning customers 110 by identifying customers 110 that acquired/accessed both the first content item 118 and the second content item 118.

Moreover, the author interface 114 may present the readership comparison data for different content items 118. For instance, the author interface 114 may display a comparison between two different content items 118 (e.g., the first title and the second title) of the same author 106 and/or a comparison between two different content items 118, such as the first title of the author 106 and a third title of a different author 106. The author interface 114 may visually depict the reader map for each title, such as the groups of customers 110 that acquired/accessed the titles and/or how each group of customers 110 makes up the total readership for each title. For titles of the same author 106, the author interface 114 may display how readership has changed, varied, and/or evolved between different titles of the same author 106. This information may also be displayed for titles of two different authors 106, where the titles may correspond to the same genre of content items 118.

In various embodiments, the author interface 114 may allow the author 106 to select any of their content items 118 in order to view data regarding that content item 118. In addition, the author 106 may select two or more content item 118 for the purpose of comparing the different content items 118. As a result, the author 106 may be presented with trends, relationships, patterns, characteristics, etc., associated with the selected content items 118 and/or the customers 110 that have acquired and/or accessed one or both of the selected content items 118.

Figure 4:
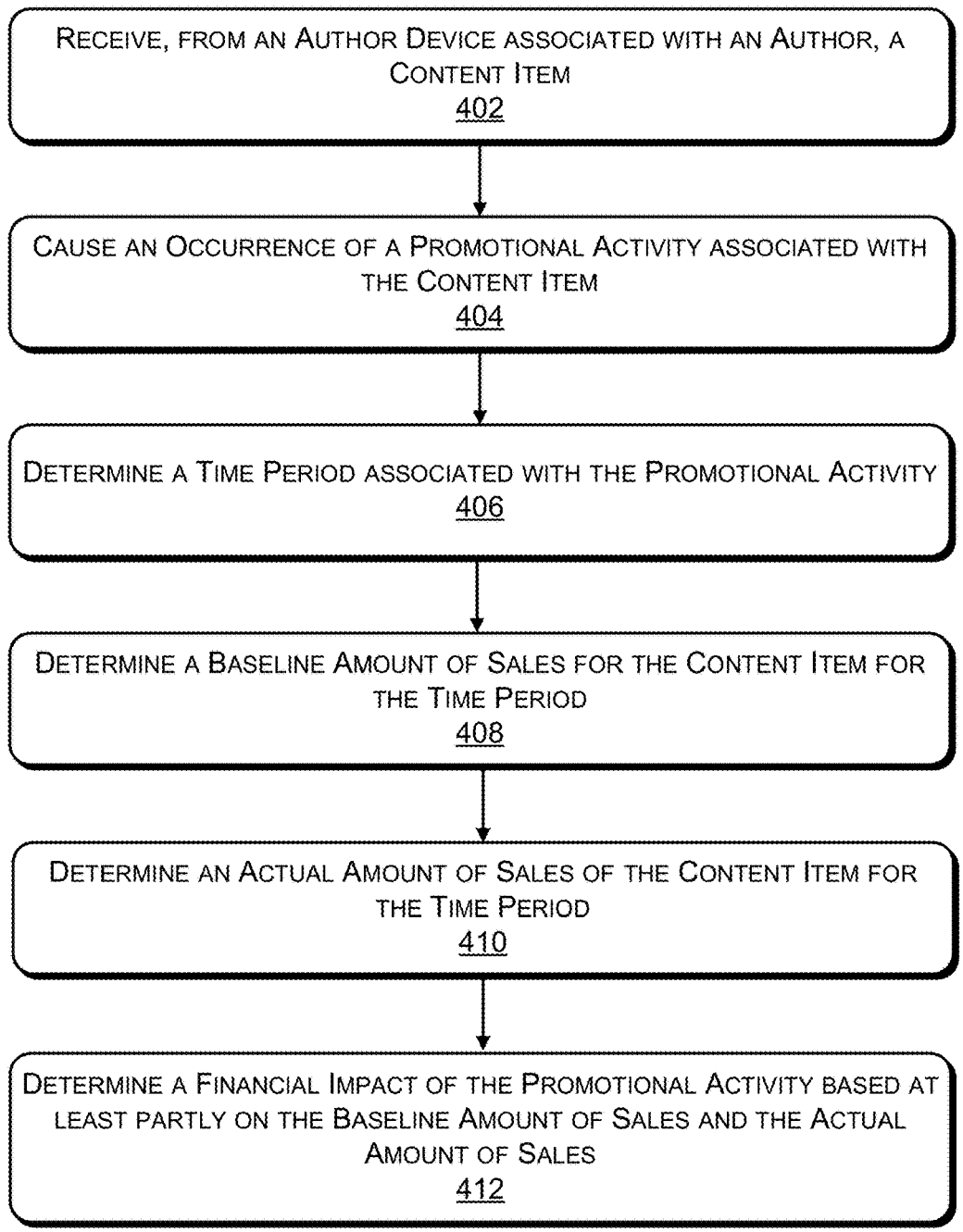
FIG. 4 is a flow diagram illustrating an example process of determining a financial impact of a promotional activity associated with a content item.
Figure 5:
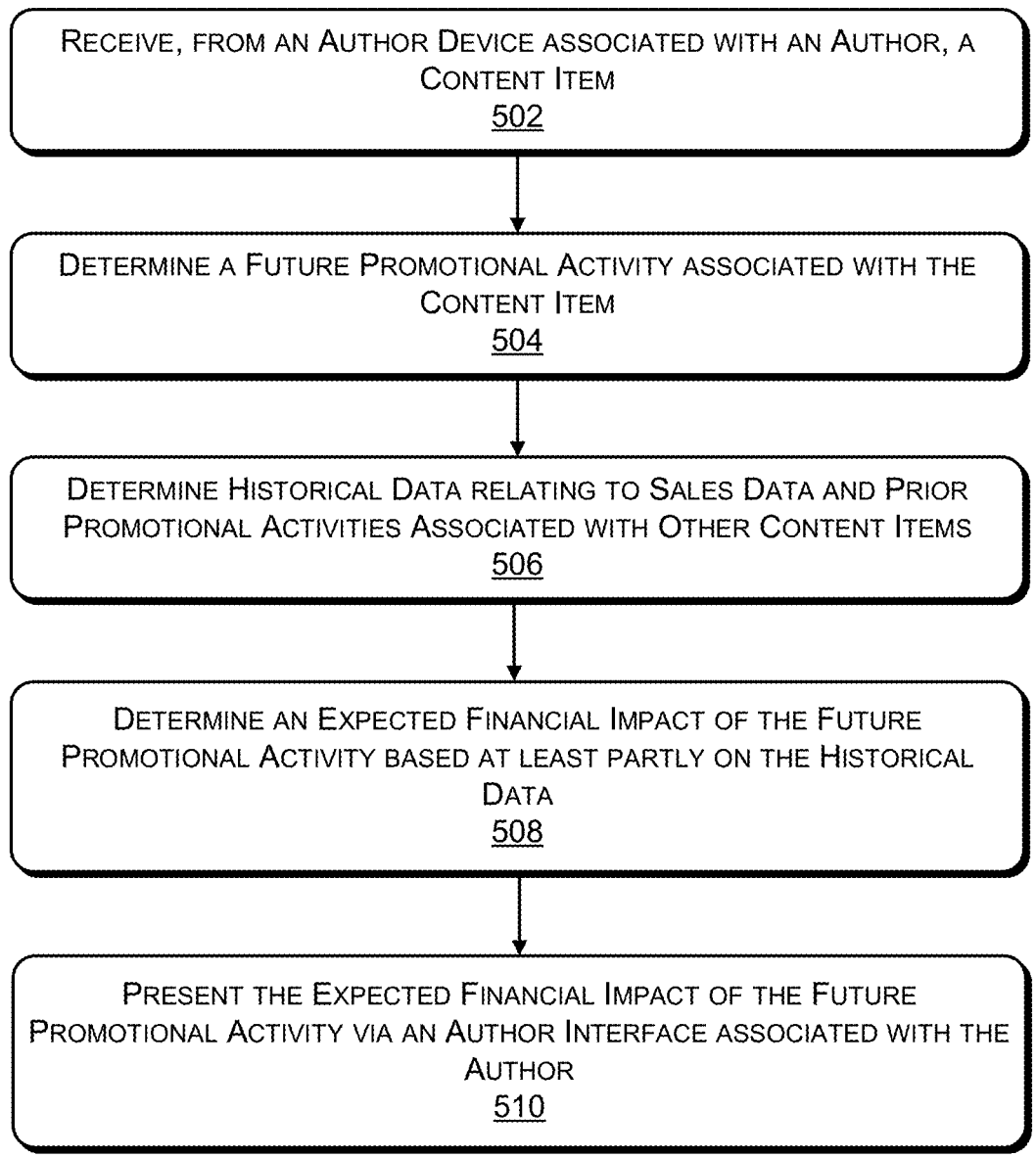
FIG. 5 is a flow diagram illustrating an example process of determining an expected financial impact of a future promotional activity associated with a content item.

FIGS. 4 and 5 illustrate example processes of determining the financial impact of a promotional activity with respect to a content item. These processes (as well as each process described herein) are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

FIG. 4 illustrates a flow diagram of an example process 400 of determining the financial impact of a promotional activity with respect to a content item. Moreover, the following actions described with respect to FIG. 4 may be performed by the service provider 102 and/or the content server(s) 104, as illustrated with respect to FIGS. 1-3.

Block 402 illustrates receiving, from an author device associated with an author, a content item. In various embodiments, the service provider 102 may receive, from authors 106, content items 118 (e.g., eBooks) that are to be offered to customers 110 on behalf of the authors 106. In exchange for publishing the content items 118 for the authors 106, the service provider 102 may receive a benefit from the authors 106, such as a portion of sales of the content items 118 when purchased via the service provider 102.

Block 404 illustrates causing an occurrence of a promotional activity associated with the content item. As a result of the service provider 102 offering the content items 118 to customers 110 on behalf of the authors 106, the service provider 102 may be responsible for marketing or advertising the content items 118, such as by performing or conducting promotional activities (e.g., e-mail marketing campaigns, electronic advertisements, book signings, presence at industry trade shows, etc.) for content items 118 on behalf of the authors 106.

Block 406 illustrates determining a time period associated with the promotional activity. In various embodiments, the service provider 102 may determine a time period associated with a promotional activity, where the service provider 102 may determine whether sales of the content item 118 during the time period are attributable to, or were caused by, the promotional activity.

Block 408 illustrates determining a baseline amount of sales for the content item for the time period. For the time period, the service provider 102 may determine an expected amount of sales of the content item 118, which may be referred to as a baseline amount of sales. The baseline amount of sales may be determined based on historical data 128 relating to prior sales of the content item 118 and/or prior sales of similar/related content items 118, such as content items 118 in the same genre, by the same author 106, in the same series, and so on.

Block 410 illustrates determining an actual amount of sales of the content item for the time period. Following the time/date of the beginning of the promotional activity, the service provider 102 may determine an actual amount of sales of the content item 118 made via the service provider 102. The actual amount of sales may correspond to a number of units sold, revenue, profits, etc., and may be determined for any time interval (e.g., every minute, hourly, daily, weekly, etc.).

Block 412 illustrates determining a financial impact of the promotional activity based at least partly on the baseline amount of sales and the actual amount of sales. More particularly, the service provider 102 may determine the financial impact of the promotional activity by subtracting the baseline amount of sales from the actual amount of sales, which may result in additional sales that are attributable to the promotional item. That is, the service provider 102 may determine that certain sales of the content item 118 were likely caused by the promotional activity associated with that content item 118.

FIG. 5 illustrates a flow diagram of an example process 500 of determining an expected financial impact of a future promotional activity with respect to a content item 118. Moreover, the following actions described with respect to FIG. 5 may be performed by the service provider 102 and/or the content server(s) 104, as illustrated with respect to FIGS. 1-3.

Block 502 illustrates receiving, from an author device associated with an author, a content item. In particular, the service provider 102 may receive, from an author 106, one or more content items 118 (e.g., one or more eBooks) that are to be offered to customers 110 on behalf of the authors 106. In exchange for publishing the content items 118 for the authors 106, the service provider 102 may receive a benefit from the authors 106, such as a portion of sales of the content items 118 when the content items 118 are purchased via the service provider 102.

Block 504 illustrates determining a future promotional activity associated with the content item 118. In various embodiments, the service provider 102 may determine one or more future promotional activities (e.g., e-mail marketing campaigns, electronic advertisements, book signings, presence at industry trade shows, etc.) for the content item 118, where the future promotional activities may be scheduled, but have yet to occur.

Block 506 illustrates determining historical data relating to sales data and prior promotional activities associated with other content items. In various embodiments, the service provider 102 may identify historical data 128 relating to other content items 118 that are similar/related to the content item 118. In addition, the service provider 102 may determine promotional activities previously performed for the other content items 118, sales data for the other content items 118, and/or the prior financial impact of the previous promotional activities with respect to the sales of the other content items 118.

Block 508 illustrates determining an expected financial impact of the future promotional activity based at least partly on the historical data. That is, the service provider 102 may leverage the historical data 128 relating to the other content items 118 in order to predict an expected financial impact of the future promotional activity. That is, the service provider 102 may predict whether the future promotional activity is likely to result in additional sales of the content item 118 (e.g., sales in excess of a baseline amount of sales that would be expected for the content item 118). If a positive financial impact is expected, the service provider 102 may predict/project an expected amount of sales that are likely to be caused by the future promotional activity. Moreover, the service provider 102 may determine an expected financial impact for different types of future promotional activities, where the expected financial impact may vary based on the type of future promotional activities, different types of content items 118, and so on.

Block 510 illustrates presenting the expected financial impact of the future promotional activity via an author interface associated with the author. In certain embodiments, via an author interface 114 that is maintained by the service provider 102 and that is accessible by the author 106, the service provider 102 may visually present various types of information (e.g., author data 140) to the author 106, which may include content items 118 of the author 106, promotional activities and/or future promotional activities of the content items 118, sales data relating to the content items 118, a financial impact of the promotional activities, and/or an expected financial impact of future promotional activities.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system associated with a service provider, comprising:
    one or more processors;
    memory; and
    one or more computer-executable instructions stored in the memory and executable by the one or more processors to perform operations comprising:
        receiving, by the one or more processors and from a device associated with an entity, a first electronic book (eBook), the first eBook to be offered to customers via at least one of a website or a mobile application associated with the service provider on behalf of the entity;
        identifying, by the one or more processors, a promotional activity associated with the first eBook, the promotional activity including at least one of an e-mail message or an electronic advertisement that is to be displayed to the customers via corresponding customer devices;
        calculating, by the one or more processors, a time period associated with the promotional activity, the time period including a first time at which the promotional activity is first displayed to the customers and a second time at which the promotional activity at least one of ceases to be displayed to the customers or expires;
        determining, by the one or more processors and based on historical sales data relating to at least one of the first eBook or a second eBook determined to be similar or related to the first eBook, a baseline amount of sales expected for the first eBook during the time period;
        determining, by the one or more processors, an actual amount of sales of the first eBook via the service provider during the time period;
        determining, by the one or more processors and based on the baseline amount of sales and the actual amount of sales, a financial impact of the promotional activity, the financial impact of the promotional activity indicating sales of the first eBook during the time period that are attributable to the promotional activity; and
        visually presenting, by the one or more processors and via an interface that is maintained by the service provider and that is accessible by the entity via the device, entity data that includes at least one of an identity of the promotional activity, the baseline amount of sales, the actual amount of sales, or the financial impact of the promotional activity, wherein visually presenting the entity data further comprises visually presenting at least one of a graph or a timeline that includes:

a sales curve representing the actual amount of sales, the sales curve being annotated with the promotional activity, the first time, and the second time; and the financial impact of the promotional activity.

2. The system as recited in claim 1, further comprising additional computer-executable instructions stored in the memory and executable by the one or more processors to perform additional operations comprising:
identifying a second promotional activity associated with the first eBook that has yet to occur;
determining a third promotional activity that was previously performed for the second eBook;
determining a second financial impact of the third promotional activity with respect to the second eBook; and
predicting an expected financial impact of the second promotional activity with respect to the first eBook, the expected financial impact of the second promotional activity representing an additional amount of sales of the first eBook that are likely to be caused by an occurrence of the second promotional activity.

3. The system as recited in claim 1, wherein determining the financial impact of the promotional activity further comprises determining that one or more customers of the customers that purchased the first eBook via the service provider at least one of viewed or selected the promotional activity prior to purchasing the first eBook.

4. The system as recited in claim 1, further comprising additional computer-executable instructions stored in the memory and executable by the one or more processors to perform additional operations comprising:
subtracting the baseline amount of sales from the actual amount of sales to generate an additional amount of sales; and
determining the financial impact of the promotional activity based on the additional amount of sales.

5. A method comprising:
receiving, by one or more computing devices associated with a service provider and from a device associated with an entity, a first electronic book (eBook), the first eBook to be offered to customers via at least one of a website or a mobile application associated with the service provider on behalf of the entity;
determining, by the one or more computing devices, a promotional activity associated with the first eBook, the promotional activity including at least one of an e-mail message or an electronic advertisement that is to be displayed to the customers via corresponding customer devices;
calculating, by the one or more computing devices, a time period associated with the promotional activity, the time period including a first time at which the promotional activity is first displayed to the customers and a second time at which the promotional activity at least one of ceases to be displayed to the customers or expires;
determining, by the one or more computing devices and based on historical sales data relating to the first eBook or a second eBook determined to be similar or related to the first eBook, a baseline amount of sales expected for the first eBook during the time period;
determining, by the one or more computing devices, an actual amount of sales for the first eBook during the time period;
determining, by the one or more computing devices and based on the baseline amount of sales and the actual amount of sales, a financial impact of the promotional activity, the financial impact of the promotional activity indicating sales of the first eBook during the time period that are attributable to the promotional activity; and visually presenting, by the one or more computing devices and via an interface that is maintained by the service provider and that is accessible by the entity via the device, entity data that includes at least one of an identity of the promotional activity, the baseline amount of sales, the actual amount of sales, or the financial impact of the promotional activity, wherein visually presenting the entity data further comprises visually presenting at least one of a graph or a timeline that includes:
a sales curve representing the actual amount of sales, the sales curve being annotated with the promotional activity, the first time, and the second time; and
the financial impact of the promotional activity.

6. The method as recited in claim 5, wherein the second eBook is also associated with the entity.

7. The method as recited in claim 5, wherein the promotional activity further includes at least one of a book signing attended by the entity or presence at a trade show or conference.

8. The method as recited in claim 5, further comprising determining the time period based on a second promotional activity conducted for the second eBook, wherein at least one of:
the second eBook is included in a same genre as the first eBook;
the second eBook and the first eBook are both associated with the entity;
the second eBook is in a same series as the first eBook;
the second eBook and the first eBook were at least one of previously acquired or previously consumed by a same customer; or
the second eBook and the first eBook were previously acquired in a same transaction.

9. The method as recited in claim 5, wherein the financial impact of the promotional activity corresponds to an additional amount of sales that are determined to likely result from the promotional activity.

10. The method as recited in claim 5, wherein determining the financial impact of the promotional activity further comprises determining that one or more customers that acquired the first eBook at least one of viewed or selected the promotional activity prior to purchasing the first eBook.

11. The method as recited in claim 5, further comprising:
identifying a second promotional activity associated with the first eBook that has yet to occur;
determining a third promotional activity that was previously performed for the second eBook;
determining a second financial impact of the third promotional activity with respect to the second eBook; and
predicting an expected financial impact of the second promotional activity with respect to the first eBook, the expected financial impact of the second promotional activity representing an additional amount of sales of the first eBook that are likely to be caused by an occurrence of the second promotional activity.

12. The method as recited in claim 11, wherein predicting the expected financial impact of the second promotional activity further comprises:
determining, using one or more machine learning techniques, whether one or more first characteristics of the third promotional activity are predictive of an increase in eBook sales; and determining, using the one or more machine learning techniques, whether one or more second characteristics of the second eBook are predictive of the increase in eBook sales.

13. The method as recited in claim 5, further comprising:
subtracting the baseline amount of sales from the actual amount of sales to generate an additional amount of sales; and
determining the financial impact of the promotional activity based on the additional amount of sales.

14. A system comprising:
one or more processors;
memory; and
one or more computer-executable instructions stored in the memory for generating a graphical user interface that is maintained by a service provider, the one or more computer-executable instructions being executable by the one or more processors to cause the graphical user interface to visually present to a device associated with an entity associated with a first eBook:
an identity of a promotional activity conducted with respect to the first eBook, the first eBook offered to customers via at least one of a website or a mobile application associated with the service provider on behalf of the entity, and the promotional activity including at least one of an e-mail message or an electronic advertisement that was displayed to the customers via corresponding customer devices;
an actual amount of sales of the first eBook during a time period associated with the promotional activity, the time period including a first time at which the promotional activity is first displayed to the customers and a second time at which the promotional activity at least one of ceases to be displayed to the customers or expires;
a baseline amount of sales expected for the first eBook during the time period, the baseline amount of sales being determined based on historical sales data relating to at least one of the first eBook or a second eBook determined to be similar or related to the first eBook;
a financial impact of the promotional activity first eBook, the financial impact of the promotional activity being based on the actual amount of sales and the baseline amount of sales, and the financial impact of the promotional activity indicating sales of the first eBook during the time period that are attributable to the promotional activity; and
a graph or a timeline that includes:
a sales curve representing the actual amount of sales, the sales curve being annotated with the promotional activity, the first time, and the second time; and
the financial impact of the promotional activity.

15. The system as recited in claim 14, wherein the graphical user interface further presents:
a second promotional activity associated with the first eBook that has yet to occur; and
an expected financial impact of the second promotional activity with respect to the first eBook, the expected financial impact of the second promotional activity indicating an expected amount of sales of the first eBook that are likely to result from the second promotional activity.

16. The system as recited in claim 14, wherein the graphical user interface further presents:
a second promotional activity associated with the first eBook that has yet to occur; and
a second financial impact associated with a third promotional activity previously conducted with respect to the second eBook, the third promotional activity determined to be similar to the second promotional activity.

17. The system as recited in claim 14, wherein the graphical user interface further presents information relating to one or more customers that acquired the first eBook, the information including at least one of an identity of the one or more customers, demographic data associated with the one or more customers, or readership preferences of the one or more customers.

18. The system as recited in claim 14, wherein the financial impact of the promotional activity is based on an additional amount of sales that is determined by subtracting the baseline amount of sales from the actual amount of sales.

19. The system as recited in claim 14, wherein the graphical user interface visually presents one or more selectable options that each correspond to a different eBook, and wherein a user selection of a selectable option of the one or more selectable options causes display of information associated with the first eBook.

20. The system as recited in claim 14, wherein the graphical user interface visually presents a royalty curve that indicates the royalties to be received by the entity as a result of sales of the first eBook by the customers.

* * * * *